No. 889,463.
PATENTED JUNE 2, 1908.
R. F. HENNE.
TROLLEY WHEEL.
APPLICATION FILED AUG. 30, 1907.
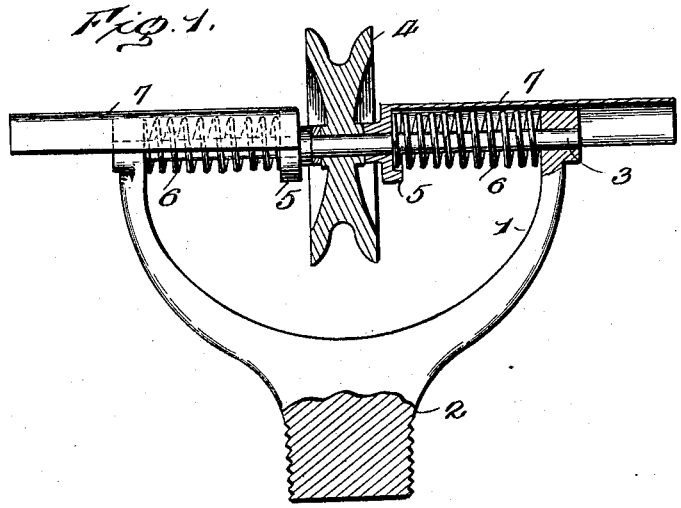
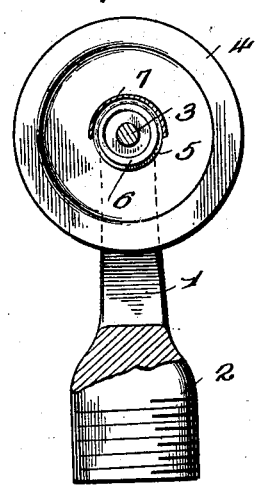
Witnesses
Inventor
Robert F. Henne
By
Lacey, Attorneys

UNITED STATES PATENT OFFICE.

ROBERT F. HENNE, OF MAMARONECK, NEW YORK.

TROLLEY-WHEEL.

No. 889,463.

Specification of Letters Patent.

Patented June 2, 1908.

Application filed August 30, 1907. Serial No. 390,819.

*To all whom it may concern:*

Be it known that I, ROBERT F. HENNE, citizen of the United States, residing at Mamaroneck, in the county of Westchester and State of New York, have invented certain new and useful Improvements in Trolley-Wheels, of which the following is a specification.

The present invention relates to certain new and useful improvements in the construction of trolleys, and more particularly to a novel method of mounting the trolley wheel whereby the same is permitted to move laterally for the purpose of accommodating itself to the trolley wire. This construction has the advantage of tending to prevent the trolley from jumping the wire and will be found particularly advantageous in rounding curves where such jumping of the trolley is a very frequent occurrence.

With this object in view the invention resides principally in the provision of a harp having a trolley wheel journaled therein so as to move laterally, spring actuated plungers being provided which bear against opposite sides of the wheel and hold the same yieldingly in a predetermined position.

For a full understanding of the invention and the merits thereof and also to acquire a knowledge of the details of construction and the means for effecting the result, reference is to be had to the following description and accompanying drawings, in which:

Figure 1 is a front elevation of a trolley constructed in accordance with the invention, parts being broken away. Fig. 2 is a side view of the trolley, portions being removed.

Corresponding and like parts are referred to in the following description and indicated in all the views of the drawings by the same reference characters.

Specifically describing the present embodiment of the invention it will be observed that the trolley harp is somewhat similar to those in common use and comprises a forked portion 1 and a stem 2, the latter being threaded for attachment to the trolley pole. The arms of the forked portion 1 of the harp have the extremities thereof connected by a shaft 3 upon which the trolley wheel 4 is journaled, the said wheel being movable longitudinally upon the shaft 3. For the purpose of holding the wheel 4 at the central portion of the shaft 3 or any other predetermined position spring actuated plungers are provided which bear yieldingly against opposite sides of the wheel. Each of these plungers comprises a disk 5 which is slidably mounted upon the shaft 3 and a spring 6 is utilized for holding the disk yieldingly against the wheel, the said spring surrounding the shaft 3 and being interposed between the disk and the corresponding arm of the forked portion of the trolley harp.

A hood 7 is carried by each of the disks 5 and projects over the corresponding spring so as to form a housing for the same and protect it from the action of the elements. These hoods 7 are shown as having an inverted U-shape in cross section and may be readily formed by suitably bending a strip of sheet material. One end of each of the hoods is rigidly connected to the disk 5 while the opposite end projects loosely over the corresponding arm of the forked portion of the trolley harp. It will thus be readily apparent that when any lateral force is exerted upon the trolley wheel the same will be shifted longitudinally upon the shaft 3 and one of the springs 6 compressed while the opposite spring is permitted to expand. However, as soon as this lateral force is removed the spring 6 will operate to move the trolley wheel back into its normal position.

Having thus described the invention, what is claimed as new is:

1. In a trolley, the combination of a harp comprising a forked portion, a shaft connecting the arms of the forked portion, a trolley wheel journaled upon the shaft and movable longitudinally thereon, plungers slidably mounted upon the shaft and engaging opposite sides of the trolley wheel, coil springs surrounding the shaft upon opposite sides of the trolley wheel and interposed between the before mentioned plungers and the arms of the harp, and hoods carried by the plungers for protecting the springs.

2. In a trolley, the combination of a harp comprising a forked portion, a shaft connecting the arms of the forked portion of the harp, a trolley wheel journaled upon the shaft and movable longitudinally thereon, plungers slidably mounted upon the shaft and engaging opposite sides of the trolley wheel, coil springs surrounding the shaft upon opposite sides of the trolley wheel and interposed between the plungers and the arms of the harp, and hoods carried by the plungers, the said hoods having an inverted U shaped cross section and extending over the springs and the arms of the forked portion of the harp.

In testimony whereof I affix my signature in presence of two witnesses.

ROBERT F. HENNE. [L. S.]

Witnesses:
 JOHN H. MCARDLE,
 RUBEN C. BENEDICT.